Figure 1:
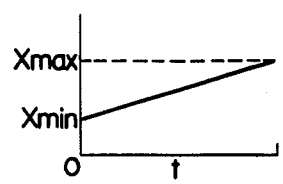
Figure 2:
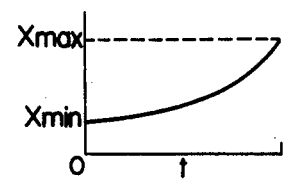

United States Patent [19]

Kuhara et al.

[11] Patent Number: 4,831,078

[45] Date of Patent: May 16, 1989

[54] PROCESS FOR PRODUCING COPOLYMER LATEX

[75] Inventors: Kohichi Kuhara; Takahiro Shimazoe, both of Yokohama; Toshiro Ishizuka, Yokosuka; Masayoshi Sekiya, Tokyo, all of Japan

[73] Assignee: Nippon Zeon Co., Ltd., Tokyo, Japan

[21] Appl. No.: 220,394

[22] Filed: Jul. 19, 1988

Related U.S. Application Data

[63] Continuation of Ser. No. 770,060, Aug. 28, 1985, abandoned.

[30] Foreign Application Priority Data

Aug. 31, 1984 [JP] Japan ................. 59-182035

[51] Int. Cl.$^4$ ............................................. C08L 33/00
[52] U.S. Cl. ................................... 524/821; 524/822
[58] Field of Search ............................... 524/821, 822

[56] References Cited

U.S. PATENT DOCUMENTS

| | | | |
|---|---|---|---|
| 3,487,032 | 12/1969 | Guzick et al. | 524/821 |
| 3,966,661 | 6/1976 | Feast et al. | 524/821 |
| 3,970,629 | 7/1976 | Izaki et al. | 524/347 |
| 4,001,163 | 1/1977 | Matner et al. | 524/821 |
| 4,358,403 | 11/1982 | Distler et al. | 524/821 |
| 4,429,074 | 1/1984 | Mishiba et al. | 524/821 |

FOREIGN PATENT DOCUMENTS

| | | | |
|---|---|---|---|
| 2332637 | 1/1975 | Fed. Rep. of Germany | 524/821 |
| 2437365 | 2/1975 | Fed. Rep. of Germany | 524/821 |
| 0134771 | 3/1979 | Fed. Rep. of Germany | 524/821 |
| 0146612 | 2/1981 | Fed. Rep. of Germany | 524/821 |
| 0094034 | 7/1975 | Japan | 524/821 |
| 0058789 | 5/1979 | Japan | 524/821 |
| 0153012 | 9/1982 | Japan | 524/821 |
| 0153011 | 9/1982 | Japan | 524/821 |
| 0180617 | 11/1982 | Japan | 524/821 |
| 0888503 | 1/1962 | United Kingdom | 524/821 |
| 0921798 | 3/1963 | United Kingdom | 524/821 |
| 2101615 | 1/1983 | United Kingdom | 524/821 |

*Primary Examiner*—Joseph L. Schofer
*Assistant Examiner*—J. M. Reddick
*Attorney, Agent, or Firm*—Sherman & Shalloway

[57] ABSTRACT

A process for producing a copolymer latex for use as a binder in a paper coating composition by emulsion polymerization while monomers and a molecular weight modifier are continuously introduced into a reactor, characterized in that (a) the molecular weight modifier is used in an amount of $X_o$ parts by weight (in which $0 < X_o \leq 10$) per 100 parts by weight of a monomeric mixture composed of (1) 20 to 50% by weight of an aliphatic conjugated diene monomer, (2) 15 to 70% by weight of a vinyl aromatic monomer, (3) 5 to 40% by weight of an alkyl ester of an ethlenically unsaturated carboxylic acid, (4) 0.5 to 10% by weight of an ethlenically unsaturated acid monomer, and (5) 0 to 30% by weight of a vinyl cyanide monomer, and (b) the molecular weight modifier is continuously added so that the amount of the molecular weight modifier added per unit time at any time t in a time period of adding the monomers and the molecular weight modifier is X(t) parts by weight per 100 parts by weight of the monomeric mixture added per unit time, wherein, (i) X(t) takes a minimum value of Xmin parts by weight and a maximum value of Xmax parts by weight within said time period of addition, and (ii) $0 \leq \text{Xmin} < X_o$, and $\text{Xmax} \geq 1.2 X_o$.

9 Claims, 2 Drawing Sheets

Xmin = 0
Xmax = 2
LATEX A

Xmin = 0.5
Xmax = 1.5
LATEX B

Xmin = 0.5
Xmax = 1.5
LATEX C

ADDITION TIME, t
(HOURS)

Xmin = 0
Xmax = 2
LATEX D

ADDITION TIME, t
(HOURS)

Xmin = 0
Xmax = 3
LATEX E

ADDITION TIME, t
(HOURS)

Xmin = 0
Xmax = 2
LATEX F

ADDITION TIME, t
(HOURS)

LATEX G

ADDITION TIME, t
(HOURS)

LATEX H

ADDITION TIME, t
(HOURS)

LATEX I

PROCESS FOR PRODUCING COPOLYMER LATEX

This application is a continuation of application Ser. No. 770,060 filed Aug. 28, 1985, now abandoned.

This invention relates to a copolymer latex suitable for use as a binder in a paper coating composition having good blister resistance and print gloss.

Pigment-coated paper using a copolymer latex as a binder has various excellent properties such as whiteness, gloss, water resistance and adhesion strength, and therefore has been used in increasing amounts with the wide-spread use of offset rotary presses. Blister resistance is one important property required of copolymer latices used in coated paper for offset rotary printing. One known method of improving the blister resistance is to control the amount of a gel in the copolymer latex (U.S. Pat. No. 3,970,629).

If, however, the amount of the gel is decreased by simply increasing the amount of the molecular weight modifiers used, the blister resistance of the copolymer latex is improved but its print gloss and adhesion strength are reduced.

The present inventors studied the method of using the molecular weight modifier in order to remove such an imbalance between blister resistance and print gloss, and have found that by using a special method of adding the modifier, the blister resistance and print gloss are improved and the adhesion strength can be fully retained even when the amount of gel as a whole remains the same.

Thus, according to this invention, there is provided a process for producing a copolymer latex for use as a binder in a paper coating composition by emulsion polymerization while monomers and a molecular weight modifier are continuously introduced into a reactor, characterized in that (a) the molecular weight modifier is used in an amount of $X_o$ parts by weight (in which $0 < X_o \leq 10$) per 100 parts by weight of a monomeric mixture composed of (1) 20 to 50% by weight of an aliphatic conjugated diene monomer, (2) 15 to 70% by weight of a vinyl aromatic monomer, (3) 5 to 40% by weight of an alkyl ester of an ethylenically unsaturated carboxylic acid, (4) 0.5 to 10% by weight of an ethylenically unsaturated acid monomer, and (5) 0 to 30% by weight of a vinyl cyanide monomer, and (b) the molecular weight modifier is continuously added so that with the amount of the molecular weight modifier added per unit time at any time t in a time period of adding the monomers and the molecular weight modifier being $X(t)$ parts by weight (per 100 parts by weight of the monomeric mixture added per unit time; on the same basis hereinafter), the following conditions are satisfied, (i) $X(t)$ takes a minimum value of Xmin parts by weight and a maximum value of Xmax parts by weight within said time period of addition, and (ii) $0 \leq Xmin < X_o$, and $Xmax \geq 1.2 X_o$.

The characteristic feature of the present invention is that the amount of the molecular weight modifier is continuously changed when a copolymer latex is produced by polymerizing the aforesaid monomeric mixture while continuously adding the monomeric mixture and molecular weight modifier into the reactor.

The invention will be described more specifically partly with reference to the accompanying drawings in which:

FIGS. 1 to 6 are graphs showing examples of the method of adding the molecular weight modifier in accordance with this invention; and FIGS. 7 to 15 graphs showing the behaviors of adding the molecular weight modifier during the production of copolymer latices in Example 1.

In these drawings, the ordinate represents the amount in parts by weight of the molecular weight modifier added and the abscissa, the addition time in hours.

Figure 3:
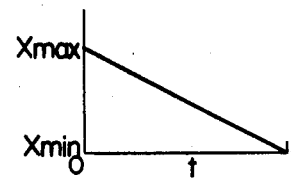
Figure 4:
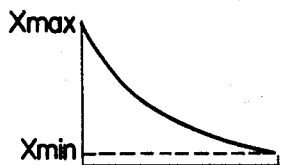
Figure 5:
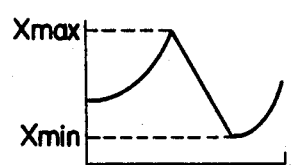
Figure 6:
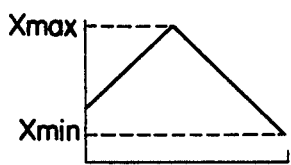
Figure 7:
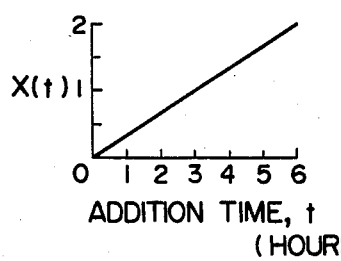
Figure 8:
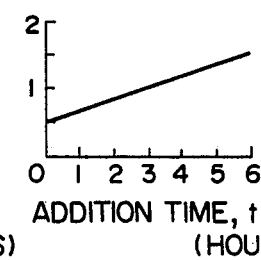
Figure 9:
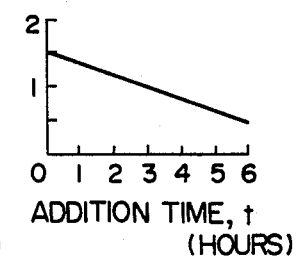
Figure 10:
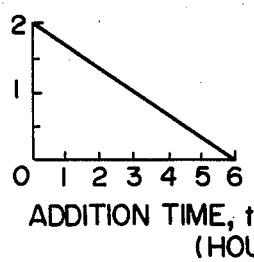
Figure 11:
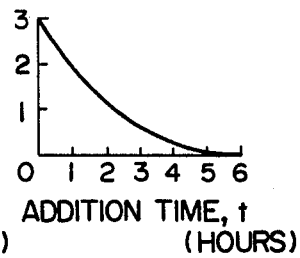
Figure 12:
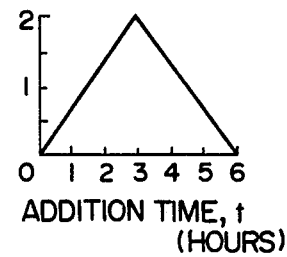
Figure 13:
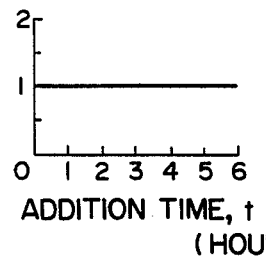

In the process of this invention, the amount of the molecular weight modifier (the percentage based on the amount of the monomeric mixture simultaneously added) to be continuously introduced into the reactor should be changed with the lapse of time so that as shown in FIGS. 1 to 6, it has a maximum value (Xmax) and a minimum value (Xmin) between the start of addition and the end of addition. The Xmin and Xmax may be at the time of starting and the time of ending respectively of the time period of addition (FIGS. 1 and 2), or may be reverse (FIGS. 3 and 4). Or both of X min and X max, or one of them, may be in an intermediate portion in the time period of addition (FIGS. 5 and 6).

Let the total amount of the molecular weight modifier used be $X_o$ parts by weight ($0 < X_o \leq 10$) per 100 parts of all of the monomers used, the following relations should be satisfied:

$$0 \leq Xmin < X_o$$

and $$1.2 X_o \leq Xmax.$$

If these conditions are not satisfied, the changes in the concentration of the molecular weight modifier with respect to the monomers added are small and the purpose of this invention cannot be fully achieved.

The copolymer latex in accordance with this invention obtained by using such a special method of adding the molecular weight modifier gives to a paper coating composition an effect of improving the balance between excellent blister resistance and print gloss which cannot be achieved by copolymer latices obtained by conventional methods, for example by a method in which all of the modifier is added at the start of polymerization, a method in which a part of the modifier is added at the start of polymerization and the remainder toward the end of polymerization, or a method in which the modifiers is uniformly added throughout the period of polymerization.

Examples of the aliphatic conjugated diene monomer (1) constituting the copolymer latex in accordance with this invention are 1,3-butadiene, 2-methyl-1,3-butadiene and 2-chloro-1,3-butadiene. This monomer (1) is a component which gives a moderate degree of flexibility to the copolymer latex. If its amount is less than 20% by weight based on the entire monomeric mixture, the copolymer latex has an increased glass transition temperature and therefore poor film-formability, and is also reduced in adhesion strength. If its amount exceeds 50% by weight, the water resistance of the copolymer latex is reduced. Preferably, the amount of the monomer (1) is 25 to 40% by weight.

Examples of the vinyl aromatic monomer (2) are styrene, alpha-methylstyrene and vinyltoluene. The monomer (2) gives a moderate degree of hardness to the copolymer latex, and water resistance of the coated paper which is important during offset printing. If the amount of the monomer (2) in the entire monomeric mixture is less than 15% by weight, the water resistance of the coated paper is insufficient. If it exceeds 75% by weight, the copolymer latex has poor film formability and reduced adhesion strength. Preferably, its amount is 30 to 60% by weight.

Examples of the alkyl ester of an ethylenically unsaturated carboxylic acid (3) include methyl acrylate, methyl methacrylate, ethyl acrylate, ethyl methacrylate, butyl acrylate, 2-ethylhexyl acrylate, monoethyl fumarate, diethyl fumarate, monoethyl itaconate, dimethyl itaconate, monobutyl fumarate, and monopropyl maleate. The monomer (3) is a component which gives a moderate degree of hardness to the copolymer latex and improves ink transfer. If its amount is less than 5% based on the entire monomeric mixture, the ink transfer property of the coated paper is insufficient. If it exceeds 40% by weight, the copolymer latex has reduced water resistance and adhesion. The preferred amount of the monomer (3) is 5 to 25% by weight.

Examples of the ethylenically unsaturated acid monomer (4) include unsaturated carboxylic acids such as acrylic acid, methacrylic acid, crotonic acid, cinnamic acid, itaconic acid, fumaric acid and maleic acid, and unsaturated sulfonic acids such as styrenesulfonic acid. The monomer (4) is a component which increases the adhesion of the copolymer latex to pigments and raw paper and simultaneously improves the mechanical stability of the copolymer latex. If the amount of the monomer (4) is less than 0.5% by weight, it is difficult to achieve the purpose of using it. If it exceeds 10% by weight, the copolymer latex has alkali-thickening property. Hence, the copolymer latex has unsatisfactory handlability and reduced water resistance. The preferred amount of the monomer (4) is 1 to 5% by weight.

Examples of the vinyl cyanide monomer (5) include acrylonitrile, alpha-chloroacrylonitrile, methacrylonitrile and alpha-ethylacrylonitrile. The monomer (5) is a component which improves the gloss of coated paper. If it exceeds 30% by weight based on the entire monomeric mixture, the adhesion to pigments and raw paper and ink transfer property of the coated paper are markedly reduced.

Another monomer may be used in an amount of up to 10% by weight based on the entire monomeric mixture in addition to the monomers (1) to (5) mentioned above. Examples include ethylenically unsaturated carboxylic acid amides and N-substituted products thereof, such as acrylamide, methacrylamide and N-methylolacrylamide; unsaturated alcohols such as allyl alcohol; and functional alkyl ester compounds such as beta-hydroxyethyl acrylate and glycidyl methacrylate.

To produce the copolymer latex of this invention, the monomers must be added continuously to the polymerization system by various methods. For example, the monomeric mixture is continuously introduced into the reactor; or the monomeric mixture is divided into two or more monomeric mixtures having varied monomer compositions and the divided monomeric mixtures are continuously added to the reactor. There is no restriction on the other polymerization conditions, and the known emulsion polymerization method may be followed. Desirably, the monomeric mixture is used after emulsifying it with an emulsifier.

Examples of the emulsifier include anionic surface-active agents such as sulfuric acid esters or higher alcohols, alkylbenzenesulfonic acid salts and aliphatic sulfonic acid salts; nonionic surface-active agents such as alkyl esters, alkylphenyl ethers and alkyl ethers of polyethylene glycols; and amphoteric surface-active agents such as betaine. These emulsifiers may be used singly or in combination. In view of the water resistance of the copolymer latex to be obtained, the amount of the emulsifier is desirably not more than 1% by weight.

As polymerization initiators, there may be used, for example, water-soluble initiators such as potassium persulfate and ammonium persulfate, redox initiators and oil-soluble initiators such as benzoyl peroxide and azobisisobutyronitrile.

Examples of the molecular weight modifiers include mercaptans such as octylmercaptan, n-dodecylmercaptan, t-dodecylmercaptan, n-tetradecylmercaptan, t-tetradecylmercaptan, n-hexadecylmercaptan and t-hexadecylmercaptan; sulfides such as tetraethyl thiuram sulfide, dipentamethylenethiuram hexasulfide and diisopropylxanthogene disulfide; and alkyl halides such as carbon tetrachloride, methyl chloride, carbon tetrabromide and ethylene bromide. These modifiers may be used singly or in combination.

Pigments which can be used to prepare a paper coating composition by mixing it with the copolymer latex of this invention include, for example, mineral pigments such as clay, calcium carbonate, aluminium hydroxide, titanium white, barium sulfate, satin white and talc, and organic pigments such as polystyrene and phenolic resins. Clay, particularly kaolinite clay, is preferred.

As a binder for the preparation of the paper coating composition, the copolymer latex obtained by this invention may be used, if required, together with another binder, for example, water-soluble polymers such as starch, casein, polyvinyl alcohol, methyl cellulose, carboxymethyl cellulose and sodium alginate; and latices such as a styrene/butadiene copolymer latex, a methyl methacrylate/butadiene copolymer latex, a polyvinyl acetate latex and an acrylate copolymer latex.

The copolymer latex of this invention may be used usually in an amount of 2 to 40% by weight based on the total amount (solids) of the pigment and binder.

The paper coating composition may further include a pigment dispersant, a viscosity adjusting agent, a water holding agent, a water-proofing agent, a dye, a fluorescent dye, a lubricant, a pH adjusting agent, a defoamer, a surface-active agent, an antiseptic agent, if required.

The following Examples illustrate the present invention more specifically. It should be understood, however, that the invention is not limited to these examples. All parts and percentages in these examples are by weight.

EXAMPLE 1

A tank equipped with a stirrer was charged with the following ingredients to form a monomer emulsion.

| | |
|---|---|
| Water | 48 parts |
| Sodium laurylsulfate | 0.2 parts |
| Sodium bicarbonate | 0.5 parts |
| Styrene | 35 parts |
| Butadiene | 31 parts |
| Methyl methacrylate | 19 parts |
| Acrylonitrile | 15 parts |

An autoclave equipped with a stirrer was charged with the following ingredients, and they were fully mixed.

| | |
|---|---|
| Water | 32 parts |
| Tetrasodium ethylenediamine-tetraacetate | 0.1 parts |
| Sodium laurylsulfate | 0.1 parts |
| Potassium persulfate | 1.0 parts |
| Itaconic acid | 1 parts |

Figure 14:
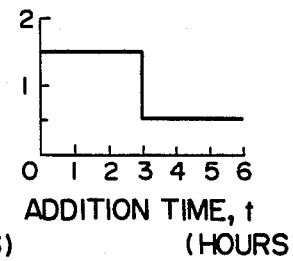
Figure 15:
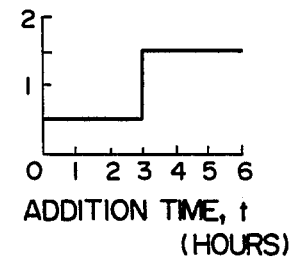

The inside of the autoclave was heated to 80° C., and the above monomer emulsion was continuously added to the autoclave uniformly over the course of 6 hours. Simultaneously, 1.0 part by weight in total of t-dodecylmercaptan was continuously introduced into the autoclave over the course of 6 hours so that the amount X(t) of dodecylmercaptan per 100 parts of the monomers added per unit time continuously changed as shown in FIGS. 7 to 12, or was continuously added at a constant rate (FIG. 13) or at two different rates (FIGS. 14 and 15).

After the addition of the monomer emulsion and t-dodecylmercaptan, 0.1 part of ammonium persulfate was added, and the reaction was carried out further for 4 hours. The reaction ended in 10 hours in total. During the reaction, the temperature of the inside of the reactor was maintained at 80° C.

The copolymer latices obtained are designated as latices A to F (invention) and latices G to I (comparison).

EXAMPLE 2

The following two copolymer latices were produced by the same technique as in the preparation of latex G above except that the total amount of t-dodecylmercaptan was changed.

Total t-todecylmercaptan: $X_o = 0.8$ part (comparative latex J)

Total t-dodecylmercaptan: $X_o = 1.2$ parts (comparative latex K)

EXAMPLE 3

Copolymer latices were produced by polymerization while continuously adding emulsions in two steps as shown in Table 1. After the addition in the first step, the addition in the second step was immediately started. Otherwise, the same procedure as in Example 1 was repeated.

1.0 Part in total of t-docecyl mercaptan was added so that its amount decreased linearly from 2 to 0 part as in the preparation of latex D of the invention, or at a uniform rate as in the preparation of comparative latex G.

TABLE 1

| | latex | | | | | |
|---|---|---|---|---|---|---|
| | L | M | N | O | P | Q |
| Component | | Invention | | | Comparsion | |
| 1st step | | | | | | |
| Water | 32.0 | 34.9 | 31.4 | Same as L | Same as M | Same as N |
| Sodium laurylsulfate | 0.13 | 0.15 | 0.13 | | | |
| Sodium bicarbonate | 0.33 | 0.36 | 0.33 | | | |
| Styrene | 40 | 34 | 34 | | | |
| Butadiene | 25.3 | 23.3 | 20.9 | | | |
| Acrylonitrile | — | 14 | 9.2 | | | |
| Itaconic acid | 1.3 | 1.5 | 1.3 | | | |
| Total (parts) | 66.6 | 72.7 | 65.4 | 66.6 | 72.7 | 64.4 |
| 2nd steps | | | | | | |
| Water | 16.0 | 13.1 | 16.6 | Same as L | Same as M | Same as N |
| Sodium laurylsulfate | 0.07 | 0.05 | 0.07 | | | |
| Sodium bicarbonate | 0.17 | 0.14 | 0.17 | | | |
| Butadiene | 12.7 | 8.7 | 11.1 | | | |
| Methyl methacrylate | 20 | 18 | 18 | | | |
| Acrylonitrile | — | — | 4.8 | | | |
| Itaconic acid | 0.7 | 0.5 | 0.7 | | | |
| Total (parts) | 33.4 | 27.3 | 34.6 | 33.4 | 27.3 | 34.6 |
| Method of adding t-dodecylmercaptan | Latex D | Latex D | Latex D | Latex G | Latex G | Latex G |

In the copolymer latices produced in Examples 1 to 3, the conversion of the monomers was more than 99%. The unreacted monomers were removed by stripping, and the pH of each of the latices was adjusted to 8.0 with sodium hydroxide. The resulting latices were used in Example 4.

EXAMPLE 4

A paper coating composition of the following recipe was prepared by using each of the copolymer latices A to K.

TABLE 2

| Mixing recipe (parts) | |
|---|---|
| Kaolin clay | 70 |
| Calcium carbonate | 30 |
| Dispersant | 0.3 |
| Sodium hydroxide | 0.2 |
| Modified starch | 6 |
| Copolymer latex | 12 |

The composition was coated on a sheet of raw paper by a blade coater at a rate of 14 g/m², and immediately then, dried in hot air at 130° C. for 20 seconds at a speed of 1 m/sec.

The coated paper was conditioned for one day at a temperature of 20° C. and a relative humidity of 65%, and supercalendered twice at a temperature of 60° C. and a linear pressure of 100 kg/cm to prepare a sample.

The samples obtained were evaluated by the following methods, and the results are shown in Table 3.

Dry pick (adhesion strength)

Offset ink (having a high tack) was printed on the sample five times using an RI tester (supplied by Akira Seisakusho). The degree of pick was observed visually, and rated by a 5-point method where point 5 means that the adhesion strength is sufficiently strong and point 1 means that the adhesion strength is quite weak.

Print gloss 0.4 cc of an offset ink was coated evenly on the sample using an electrically operated RI tester, and immediately then dried with hot air. The 75° specular gloss of the printed surface was measured. The data indicated are averages of the measured values of five samples.

Blister resistance

A test sample was prepared in accordance with TAPPI Standard T-526, and dipped for about 3 seconds in each of silicone oil baths kept at various temperatures. The sample was dried and observed for the occurrence of blisters. By this procedure, the lowest temperature at which blisters formed was determined.

TABLE 3

| Item of evaluation | Latex | | | | | | | | | | |
|---|---|---|---|---|---|---|---|---|---|---|---|
| | A | B | C | D | E | F | G | H | I | J | K |
| | Invention | | | | | | | Comparison | | | |
| Blister resistance (°C.) | 215 | 220 | 230 | 235 | 240 | 220 | 205 | 195 | 225 | 180 | 235 |
| Print gloss (%) | 69 | 68 | 68 | 67 | 65 | 67 | 64 | 65 | 62 | 66 | 60 |
| Dry pick (5-point method) | 4.0 | 3.8 | 3.6 | 3.6 | 3.4 | 3.6 | 3.4 | 4.2 | 3.2 | 4.4 | 2.8 |

The results show that by using the latex of this invention, there can be obtained a coated paper having blister resistance, print gloss and adhesion strength in good balance.

EXAMPLE 5

Using the copolymer latices L to Q, samples were prepared, and evaluated, under the same conditions as in Example 4. The results are shown in Table 4.

TABLE 4

| Item of evaluation | Latex | | | | | |
|---|---|---|---|---|---|---|
| | L | M | N | O | P | Q |
| | Invention | | | Comparison | | |
| Blister resistance (°C.) | 245 | 225 | 215 | 225 | 210 | 195 |
| Print gloss (%) | 65 | 67 | 68 | 60 | 63 | 63 |
| Dry pick (5-point method) | 3.4 | 3.8 | 4.0 | 3.2 | 3.4 | 4.0 |

What is claimed is:

1. A process for producing a copolymer latex for use as a binder in a paper coating composition which comprises continuously introducing into a reaction zone under emulsion polymerization conditions
   (a) a monomeric mixture composed of (1) 20 to 50% by weight of an aliphatic conjugated diene monomer, (2) 15 to 70% by weight of a vinyl aromatic monomer, (3) 5 to 40% by weight of an alkyl ester of an ethylenically unsaturated carboxylic acid, (4) 0.5 to 10% by weight of an ethylenically unsaturated acid monomer, and (5) 0 to 30% by weight of a vinyl cyanide monomer, in the presence of
   (b) a molecular weight modifier in an amount of $X_o$ parts by weight, per 100 parts by weight of the monomeric mixture (a), where $0 < X_o \leq 10$, wherein the molecular weight modifier is added to the monomeric mixture in the reaction zone in continuously varying amounts such that the amount $X(t)$, in parts by weight, per 100 parts by weight of the monomer mixture, of the molecular weight modifier added per unit time at any time t during the introduction to the reaction zone of the monomeric mixture and molecular weight modifier has both a minimum value Xmin parts by weight and a maximum value Xmax parts by weight with $0 \leq X\text{min} < X_o$ and $X\text{max} \geq 1.2 X_o$.

2. The process of claim 1 wherein the amount $X(t)$ of the molecular weight modifier added per unit time is increased as the addition time lapses, so that it is minimum at the start of addition and becomes maximum at the end of addition.

3. The process of claim 1 wherein the amount $X(t)$ of the molecular weight modifier per unit time is decreased as the addition time lapses, so that it is maximum at the start of addition and becomes minimum at the end of addition.

4. The process of claim 1 wherein said time period of addition includes at least one time zone where the amount $X(t)$ of the molecular weight modifier per unit time increases as the addition time lapses, and at least one time zone where the amount $X(t)$ of the molecular weight modifier added per unit time decreases as the addition time lapses.

5. A process for producing a copolymer latex combining good print gloss, adhesion strength and blister resistance during offset printing when used as a binder in a paper coating composition, said process comprising
   continuously introducing into a reaction zone under emulsion polymerization conditions a monomer mixture comprising (1) 25 to 40% by weight of an aliphatic conjugated diene monomer, (2) 30 to 60% by weight of a vinyl aromatic monomer, (3) 5 to 25% by weight of an alkyl ester of an ethylenically unsaturated carboxylic acid, (4) 1 to 5% by weight of an ethylenically unsaturated acid monomer, and (5) 0 to 30% by weight of a vinyl cyanide monomer, in the presence of a molecular weight modifier in an amount of $X_o$ parts by weight, per 100 parts by weight of the monomeric mixture, where $0 < X_o \leq 10$, wherein the molecular weight modifier is added to the monomer mixture in the reaction zone in continuously varying amounts such that the amount $X(t)$, in parts by weight, per 100 parts by weight of the monomer mixture, of the molecular weight modifier added per unit time at any time t during the introduction to the reaction zone of the monomer mixture and molecular weight modifier has both a minimum value $X_{min}$ parts by weight and a maximum value $X_{max}$ parts by weight with $0 \leq X_{min} < X_o$, and $X_{max} \geq 1.2 X_o$.

6. A process for producing a copolymer latex combining good print gloss, adhesion strength and blister resistance during offset printing when used as a binder in a paper coating composition, said process comprising
   continuously introducing into a reaction zone under emulsion polymerization conditions a monomer mixture comprising (1) 20 to 50% by weight of 1,3-butadiene, 2-methyl-1,3-butadiene or 2-chloro-1,3-butadiene, (2) 15 to 75% by weight of styrene, α-methylstyrene or vinyltoluene, (3) 5 to 40% by weight of methyl acrylate, methyl methacrylate, ethyl acrylate, ethyl methacrylate, butyl acrylate, 2-ethylhexyl acrylate, monoethyl fumarate, diethyl fumarate, monoethyl itaconate, dimethylitaconate, monobutyl fumarate, or monopropyl maleate, (4) 0.5 to 10% by weight of acrylic acid, methacrylic acid, crotonic acid, cinnamic acid, itaconic acid, fumaric acid or maleic acid, and (5) 0 to 30% by weight of acrylonitrile, alpha-chloroacrylonitrile, methacrylonitrile or alpha-ethylacrylonitrile, in the presence of a molecular weight modifier in an amount of $X_o$ parts by weight, per 100 parts by weight of the monomeric mixture, where $0 < X_o \leq 10$, wherein the molecular weight modifier is added to the monomer mixture in the reaction zone in continuously varying amounts such that the amount $X(t)$, in parts by weight, per 100 parts by weight of the monomer mixture, of the molecular weight modifier added per unit time at any time t during the introduction to the reaction zone of the monomer mixture and molecular weight modifier has both a minimum value $X_{min}$ parts by weight and a maximum value $X_{max}$ parts by weight with $0 \leq X_{min} < X_o$, and $X_{max} \geq 1.2 X_o$.

7. The process of claim 6 wherein the molecular weight modifier is at least one compound selected from the group consisting of mercaptans, sulfides and alkyl halides.

8. The process of claim 5 wherein the molecular weight modifier is at least one compound selected from the group consisting of mercaptans, sulfides and allkyl halides.

9. The process of claim 1 wherein the molecular weight modifier is at least one compound selected from the group consisting of mercaptans, sulfides and alkyl halides.

* * * * *